(12) United States Patent
Sá

(10) Patent No.: US 10,933,724 B2
(45) Date of Patent: Mar. 2, 2021

(54) SHIELDING INSTALLATION DEVICE IN LARGE TIRES AND SHIELDING INSTALLATION METHOD

(71) Applicant: VALE S.A., Rio de Janeiro (BR)

(72) Inventor: Frederico Quintão de Sá, Parauapebas (BR)

(73) Assignee: VALE S.A., Rio de Janeiro (BR)

( * ) Notice: Subject to any disclaimer, the term of this patent is extended or adjusted under 35 U.S.C. 154(b) by 86 days.

(21) Appl. No.: 15/612,133

(22) Filed: Jun. 2, 2017

(65) Prior Publication Data

US 2017/0354987 A1 Dec. 14, 2017

(30) Foreign Application Priority Data

Jun. 8, 2016 (BR) .......................... 102016013188-0

(51) Int. Cl.
| | | |
|---|---|---|
| *B60J 11/10* | (2006.01) | |
| *B60C 27/06* | (2006.01) | |
| *B60C 27/14* | (2006.01) | |
| *B60C 13/00* | (2006.01) | |
| *B60C 1/00* | (2006.01) | |

(52) U.S. Cl.
CPC ............. *B60J 11/10* (2013.01); *B60C 13/002* (2013.01); *B60C 27/06* (2013.01); *B60C 27/14* (2013.01); *B60C 1/0016* (2013.01); *B60C 2200/065* (2013.01)

(58) Field of Classification Search
CPC . B60C 25/135; B60C 25/0593; B60C 25/138; B60C 25/04; B60C 25/05; B60C 25/0503; B60C 25/0521; B60C 25/0545; B60C 27/06; B60C 27/003; B60C 27/145; B60C 27/14; B60B 29/00; B60B 29/001; B60B 30/00; B60B 30/02; B60B 30/06; B60B 30/08; B60B 30/10
USPC .......... 152/214, 213 R; 157/1.24, 1.26, 1.28; 414/426, 427
See application file for complete search history.

(56) References Cited

U.S. PATENT DOCUMENTS

| | | | | |
|---|---|---|---|---|
| 3,858,735 A | * | 1/1975 | Zrostlik | ................... B60C 25/00 414/427 |
| 4,709,432 A | | 12/1987 | Barrick | |
| 5,668,731 A | * | 9/1997 | Mancosu | ............ B23K 26/0823 157/13 |
| 6,047,754 A | * | 4/2000 | Drum | ...................... B60C 27/10 152/213 R |
| 8,672,729 B2 | | 3/2014 | Boisjoli | |
| 2006/0027334 A1 | | 2/2006 | Boni | |
| 2008/0196809 A1 | * | 8/2008 | Stewart | .................... B60C 27/14 152/214 |
| 2011/0290428 A1 | * | 12/2011 | Roussel | .................. B60B 30/06 157/1.22 |

(Continued)

*Primary Examiner* — Orlando E Aviles
*Assistant Examiner* — Seahee Hong
(74) *Attorney, Agent, or Firm* — Arent Fox LLP

(57) ABSTRACT

Described is a shielding installation device in large tires and a shielding installation method in large tires. The device comprises a shaft, a reducer, a motor, a base, and a frame. The shielding installation method comprises different sequential steps, configured for installation of shielding on the thread of a large tire. The device and method of use of this device can allow a safe and practical installation of shielding in large vehicles, solving the serious safety problem related to traditional techniques of installation of this element.

8 Claims, 2 Drawing Sheets

(56) References Cited

U.S. PATENT DOCUMENTS

| | | | |
|---|---|---|---|
| 2014/0309071 A1* | 10/2014 | Croce | F16H 57/082 |
| | | | 475/207 |
| 2016/0251205 A1* | 9/2016 | Yaschur | B66F 7/246 |
| | | | 254/133 R |
| 2018/0250683 A1* | 9/2018 | Stokes | B26D 1/16 |

* cited by examiner

SHIELDING INSTALLATION DEVICE IN LARGE TIRES AND SHIELDING INSTALLATION METHOD

CROSS-REFERENCE TO RELATED APPLICATION

This application is based upon and claims the benefit of priority to Brazilian Patent Application No. 102016013188-0, filed Jun. 8, 2016. The disclosure of the priority application is hereby incorporated in its entirety by reference.

BACKGROUND

This invention relates to a shielding installation device in large tires and a shielding installation method that uses the shielding installation device.

Large tires are used in large vehicles, such as those used in mining operations (large wheel loaders and off-highway trucks, for example). For purposes of delimiting the scope of this invention, the term "large tire" means any tire having external diameter between 2 and 5 meters and between 3 and 15 tons in weight.

As these devices are applied in the mining sector, the land on which they move is often slippery, with much mud and loose substrate, during rainy season, which creates a great risk of bogging. To prevent these machines from bogging or slipping during their displacement, metal shields are installed on their tires.

In general, the shielding of large tires consists of a metallic mesh of intertwined chains which surrounds the tire thread, increasing the contact surface of this object, therefore ensuring higher adherence between the tire and the ground which, in turn, avoids slipping and bogging of the vehicle with these elements. To facilitate the understanding of this invention, the term "tire" means the wheel set, which means the wheel block and the tire as a whole.

Since they are large tires, the shielding mesh also is large and, thus, becomes too heavy to be loaded and applied to the tire manually.

In the technique status, the shielding of wheel loader tires is made with assistance of the wheel loader itself and of at least four employees, being: two maintainers, one signaler, and one wheel loader operator.

The wheel loader operator is responsible for moving and controlling the machine during the shielding operation. He lifts the wheel loader bucket so that other workers have access to front tires of the wheel loader, see FIG. 1.

Maintainers are responsible for positioning the chain mesh during the shielding process. After the machine is duly parked by the operator, the maintainers place the open mesh on the floor, attaching one of the mesh ends in the tire they want to shield.

After one end of the chain mesh is attached, the machine operator moves the wheel loader, causing the mesh to be wrapped around the tire, thereby performing its shielding.

As the operator moves the wheel loader, the signaler keeps distance from the machine, checking if the chain mesh is in line with the tire, and if there was any failure during the procedure.

During the equipment movement, maintainers also align the mesh with the tire manually, with the assistance of metallic hooks.

Therefore, maintainers are exposed to the risk of being run over by the wheel loader, or even being crushed by the bucket due to a failure in the machine hydraulic system. In addition, it required a great physical effort of the maintainers to perform the alignment of the chain mesh by using hand tools.

To be performed manually, the operation demands an elevated execution time, as well as requiring an excessive number of workers involved in this work.

The technique status also comprises some devices to assist in the shielding and handling of large tires, which are listed and summarized below.

Document U.S. Pat. No. 4,709,432 discloses a device configured for application of chains for tires of different sizes. The device comprises a based fitted with two triangular prisms laid out in parallel.

The triangular prisms are configured to maintain the wheel elevated, causing it to rotate in false when positioned in the space provided between the two. The prisms also ensure perfect alignment of the chain with the tire, thus facilitating its application. The base is also provided with holes in its lower face, which are configured to enable a coupling to hydraulic jacks for a higher elevation of the wheel.

However, the use of such a device in large tires promotes a great friction with the grooves found in tires, preventing them from turning in false, without moving the prisms of the device.

This device also generates an exposure of workers to severe risk of being run over, since the large vehicle needs to be moved to apply the shielding, and the chain mesh needs to be positioned close to the vehicle at the time of installation.

Furthermore, large vehicles require slow moving, thus requiring a long time for application and maneuvering for positioning the device.

Document US20060027334 discloses a device for removal and installation of tires on large wheels. The device comprises a motor, a holder and a mechanical arm.

The wheel is coupled to the support configured to fix it and hold it at a given distance from the ground. Both elements when coupled are rotated by the motor. The motor is connected to reducers that allow to change the speed at which you want to rotate the wheel.

The mechanical arm of the device is responsible for removing the tire while it is rotated. The said arm comprises a hook at its end, configured to access the space between the wheel and the tire, and thus pulling it out of the wheel.

However, such a device is specifically employed to remove and apply tires on large wheels and, therefore, is not used to perform the tire shielding.

Furthermore, the device comprises a mechanical arm which would prevent the chain mesh to be applied around the tire, clashing with the mechanical arm and damaging the device.

Document U.S. Pat. No. 8,672,729 discloses a device configured for polishing of truck and car tires. Such device comprises a motor, a wheel holder and a riding skid.

The wheel removed from the truck is coupled to the wheel holder, so that they are rotated by the motor. The motor is connected to reducers that allow to choose the speed at which you want to work.

The riding skid is used only to carry the device near the truck and, therefore, ensure greater speed in the process. The device also allows an angular adjustment of the wheel holder, and can be adapted to different wheel sizes.

However, the device disclosed in U.S. Pat. No. 8,672,729 is specifically configured to perform the polishing and other treatments in the vehicle wheel, not being configured to perform shielding of large tires.

In addition, the device is configured to perform the support of car and truck tires, not being suitable for use in large tires.

Therefore, it is concluded that, in the technique status, there is no shielding installation device in large tires that performs the shielding in a fast and practical manner. In addition, in the technique status, there is no device that perform shielding installation safely, without exposing workers to hazards and non-ergonomic conditions.

Aspects of the present invention include a shielding installation device for large tires, able to perform the shielding quickly and safely.

Aspects of the invention also include a shielding installation method that uses the shielding installation device for large tires.

BRIEF DESCRIPTION OF DRAWINGS

This invention is described in detail, based on the respective figures.

DETAILED DESCRIPTION OF INVENTION

Figure 1:
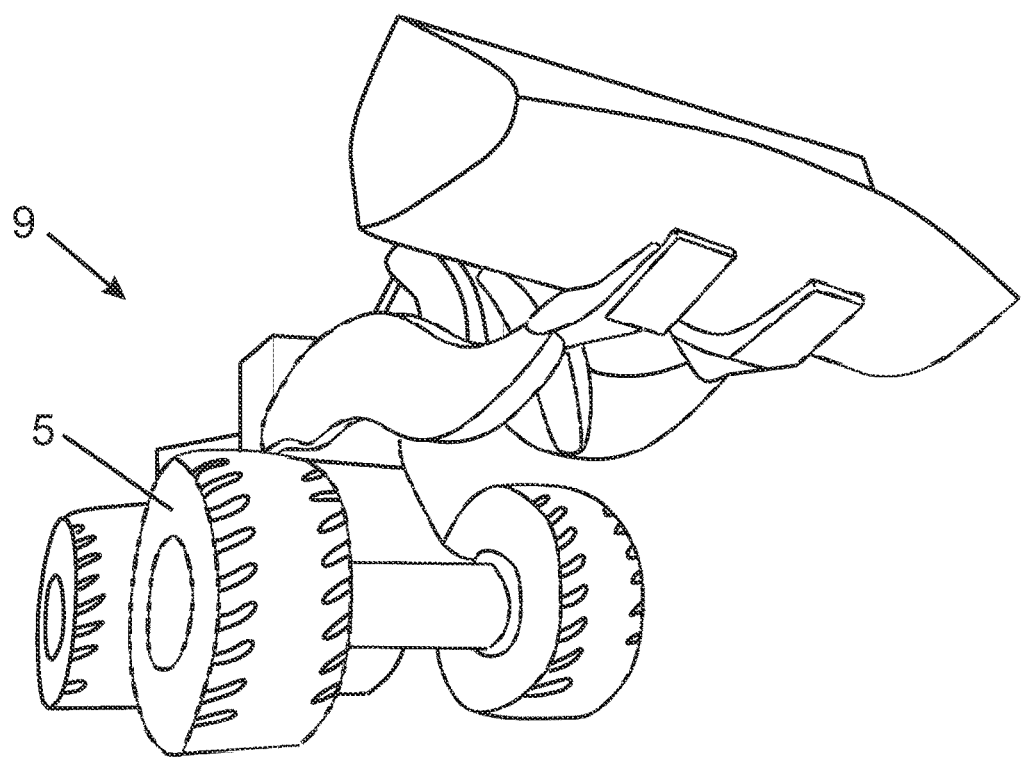
FIG. 1 is a perspective view of a large wheel loader machine.

The present invention includes a shielding installation device 10 for large tires 5. The device 10 is configured to rotate the large tire 5 off the vehicle 9 in which it is applied, thus making it possible to rotate the tire 5 in a safe distance from the ground, and at a suitable speed to install the shielding 7.

The safety of the shielding 7 installation process is also increased, because, as the large tire 5 is removed from the vehicle 9 to install the shielding 7, the workers are not exposed during the movement of the vehicle 9. Thus, the risk of being hit by the vehicle 9, or being crushed wheel loader bucket are eliminated, since it is no longer moved during the process.

Figure 2:
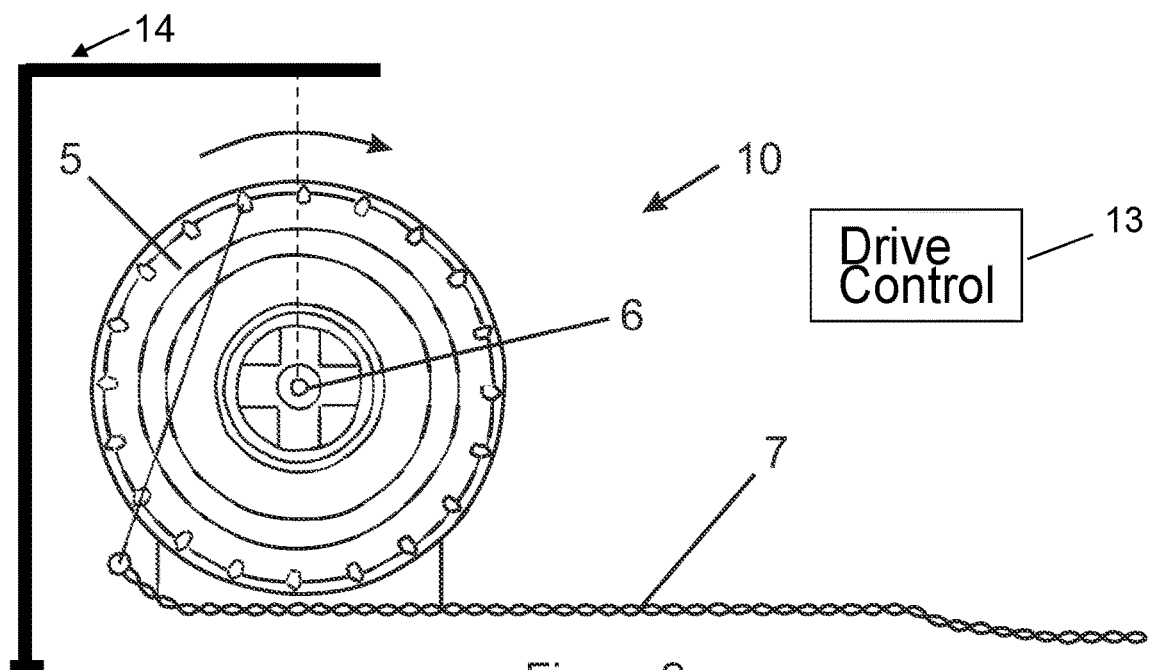
FIG. 2 is a front view of the shielding installation device for large tires.
Figure 3:
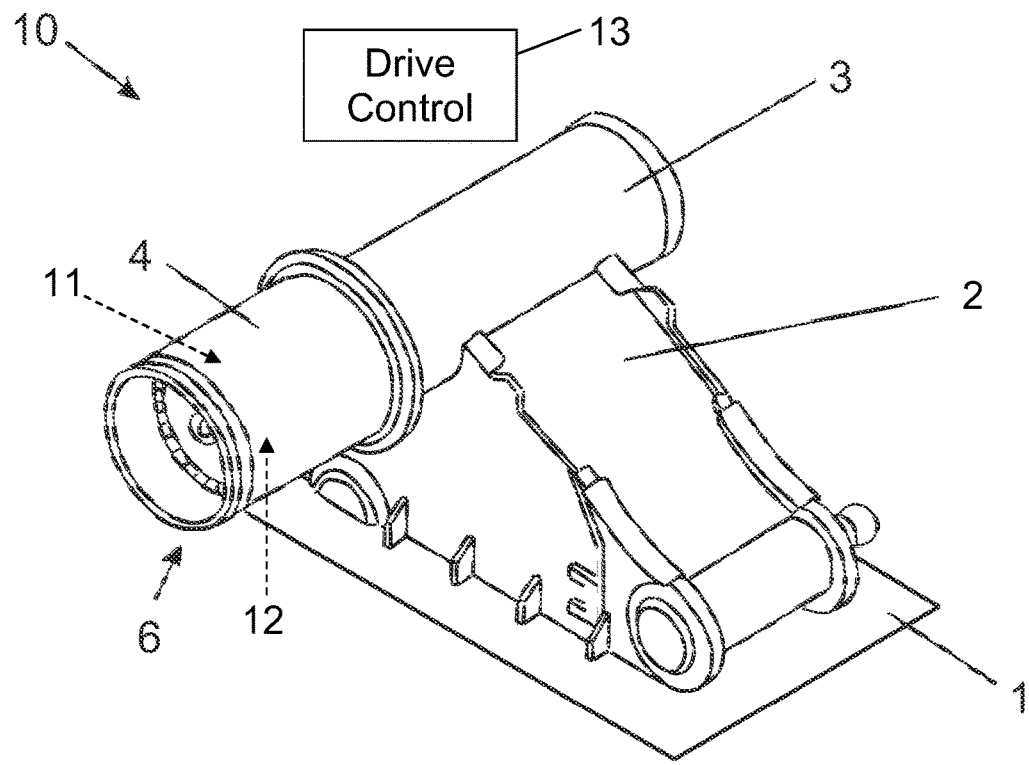
FIG. 3 is a side view of the shielding installation device for large tires.
Figure 4:
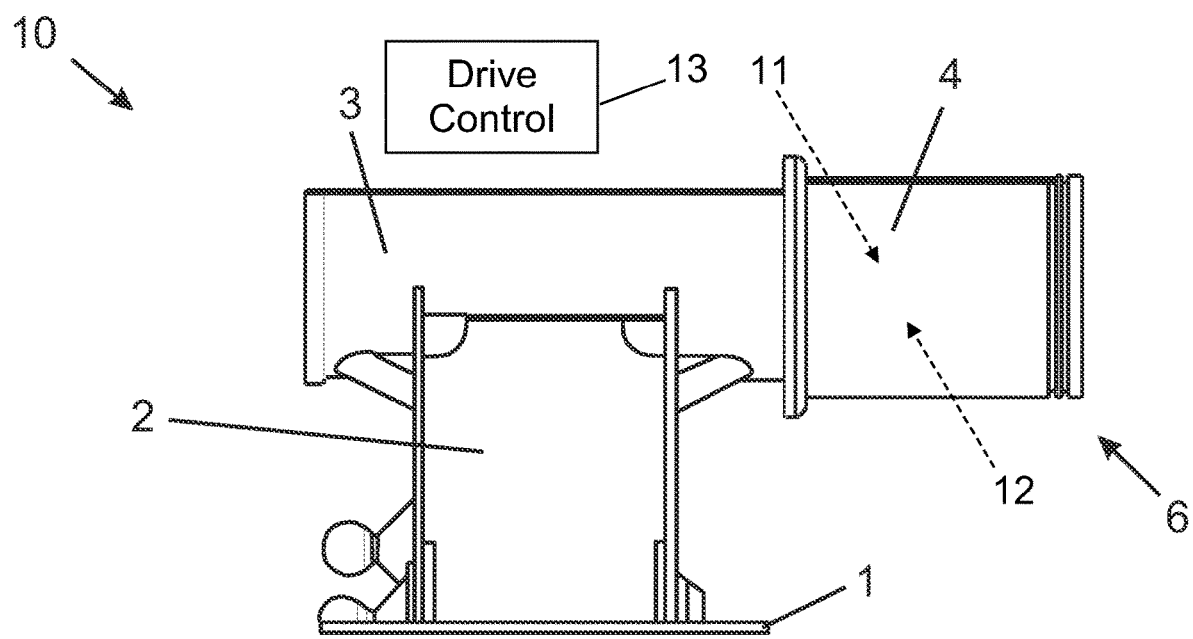
FIG. 4 is a perspective view of the shielding installation device for large tires.

The device 10 of this invention comprises a base 1, a frame 2, a motor 3, a reducer 4, and a drive control 13 (see FIGS. 2, 3 and 4). Base 1 includes a plate configured to attach the frame 2 to the ground, ensuring the balance of the device 10 during operation.

Such base 1 is provided with two flat faces, one in contact with the ground, and the other attached to the frame 2 of the device 10. The frame 2 includes a structure configured to support the rotating elements of the device 10 and keep the large tire 5 at a safe distance from the ground during operation.

Such chassis 2 comprises a shaft 6 in its upper part, configured to support the large tire 5 when installed to the device 10, where the rotating elements to rotate the large tire 5 are installed. The motor 3 is installed on the shaft 6 of the frame 2, being configured to perform rotation and consequently ensure the necessary movement during installation of the shielding 7.

The reducer 4 is coupled to the motor 3, so that it is rotated with the frame 2 shaft. The reducer 4 is configured to adjust the rotation speed provided by the motor, so that it is possible to reduce or increase the rotation speed according to the need.

The reducer 4 also comprises a brake 11, configured to stop the shaft 6 in a faster and more practical way. In addition, the brake 11 also ensure more safety during the placement and removal of the large tire 5 in the device.

The motor 3 and the reducer 4 are connected to the drive control 13, which is configured to turn these elements on and off. The drive control 13 activates the motor 3, and allows to regulate the rotation speed through the reducer 4.

In addition, the drive control 13 also comprises a button to activate the break provided in reducer 4, therefore ensuring the safety of the device 10 operator.

The preferential configuration of base 1 includes a metallic plate, in order to have a higher strength to support the weight of frame 2 without damage or deformations that would imply in the loss of balance of the device 10.

The preferential configuration of frame 2 includes a metallic structure fitted with a shaft 6, also metallic, in order to support the efforts during the rotation and sustentation of the large wheel 5.

The preferential configuration of engine 3 includes an electric motor with power adequate to perform the rotation of the shaft 6 and large tire 5. As an alternative, combustion motors or other types of energy sources may be used to the rotation of shaft 6.

The preferential configuration of reducer 4 includes a reducer comprising planetary gears 12, which make it able of reaching a reduction of up to 99:1. As an alternative, other types of reducers may be used, comprising other types of gears, only being required to perform an adjustment of the speed provided by motor 3, for each reducer 4 used by the device 10.

The preferential configuration of drive control 13 includes a small control that may be kept at a safe distance from the device 10. As an alternative, the drive control 13 may be attached near to the device 10, so that the operator needs to stay very close to device 10.

This invention also comprises a shielding 7 installation method for large tires 5, using the device 10. Such method comprises 8 steps, duly described below.

The first step is the removal of the large tire 5 from the large vehicle 9. In this step, the worker raises the vehicle 9 to remove the tire 5, and then transport it to the device 10.

The second step is the application of the large tire 5 to the device 10. Such application is performed by a lifting equipment 14, which raises the tire 5 so that it is installed in the shaft 6 of the device.

The third step is the positioning of the shielding 7 mesh to shield the tire 5. The shielding 7 mesh is placed and laid open on the ground, so as it is in line with the tire 5 thread (see FIG. 2).

The fourth step includes attaching one of the ends of the shielding 7 mesh to the large tire 5. Such attaching is carried by a hook at the end the shielding 7 mesh.

The fifth step is the rotation of the large tire 5 in the device 10. Such stage is performed by activating the motor 3, which is activated by the drive control 13. The motor 3 is turned on and rotates the shaft 6, which then rotates the large tire 5.

Shielding 7 mesh, with one of its ends attached to the tire 5 on the fourth step, is then wrapped according to the rotation of tire 5, so as it is shielded.

The sixth step is the adjustment of shielding 7 of the large tire 5. In this step, workers make the attachments and adjustments required for a perfect shielding.

To make adjustments, the shaft 6 is rotated at a low speed, controlled by the reducer 4, thus ensuring greater safety for the workers who perform the adjustment of the shielding 7 by using hand tools.

The seventh step is the removal of the large tire 5 from the device 10. To perform this step the operator must stop the rotation of the device to avoid accidents. Such stop of device 10 is performed by the drive control 13, which brakes the shaft 6, and turns off the motor 3, ensuring that the tire 5 does not rotate during its removal.

The removal, and also the application of the tire 5, is performed through a lifting equipment 14 (a munck, a forklift or any crane, for example) which transports the tire 5 from its support point on shaft 6 to the vehicle 9 where it will be applied.

The eighth and last step is the installation of tire 5 in the vehicle 9 where it will be applied. Such operation is also performed by lifting the machine to attach the tire 5.

Having described some examples of preferred achievement of the invention, it is noteworthy that the scope of protection given by this document encompasses all other alternative forms appropriate to the execution of the invention, which is defined and limited only by the content of the claim scope attached.

The invention claimed is:

1. A device capable of installing shielding on a large tire having an external diameter from 2 to 5 meters and a weight from 3 to 15 tons, comprising:
   a single shaft;
   a reducer;
   a motor;
   a base plate; and
   a frame,
   wherein:
      the single shaft is permanently associated to the reducer;
      the reducer is coupled in line with the motor through the single shaft, wherein the reducer can promote a reduction of 99:1;
      at least a part of the single shaft, the reducer, and the motor are permanently attached to the frame;
      the frame is laid out on the base plate;
      the motor, the reducer, the single shaft, and the frame are capable of supporting and handling the large tire;
      the device is configured to install the shielding on the large tire when the large tire is removed form a vehicle comprising the large tire, and at a distance from the ground; and
      the shielding comprises a metallic mesh of intertwined chains, able to increase adherence and a contact surface of a thread of the large tire.

2. The device according to claim 1, further comprising a brake configured to reduce a rotation speed when stopping the single shaft, after installing the shielding.

3. The device according to claim 2, wherein the reducer comprises planetary gears.

4. The device according to claim 1, wherein the motor comprises an electric motor.

5. The device according to claim 1, wherein the device is manipulated by a drive control located remote from the device.

6. A method for installing shielding on a large tire, comprising:
   removing the large tire from a large vehicle, wherein the large tire has an external diameter from 2 to 5 meters and has a weight from 3 to 15 tons;
   applying the large tire to the device of claim 1 using a lifting equipment;
   positioning a shielding mesh;
   attaching one end of the shielding mesh to the large tire;
   rotating the large tire in the device;
   adjusting the shielding mesh of the large tire;
   removing the large tire from the device; and
   installing the large tire in the large vehicle.

7. The method of claim 6, further comprising attaching one end of the shielding mesh to the large tire with a hook at the end the shielding mesh.

8. A device capable of installing shielding on a large tire having an external diameter from 2 to 5 meters and a weight from 3 to 15 tons, comprising:
   a single shaft;
   a reducer;
   a motor;
   a base plate; and
   a frame;
   wherein:
      the single shaft is permanently associated to the reducer;
      the reducer is coupled in line with the motor through the single shaft, wherein the reducer can promote a reduction of 99:1;
      at least a part of the single shaft, the reducer, and the motor are permanently attached to the frame;
      the frame is laid out on the base plate;
      the motor, the reducer, the single shaft, and the frame are capable of supporting and handling the large tire; and
      the device is configured to install the shielding on the large tire when the large tire is removed from a vehicle comprising the large tire, and at a distance from ground, using a hook at an end of the shielding.

* * * * *